No. 829,714. PATENTED AUG. 28, 1906.
C. HILDENBRAND.
GRAIN LIFTING ATTACHMENT FOR HARVESTERS.
APPLICATION FILED NOV. 28, 1905.
Fig. I
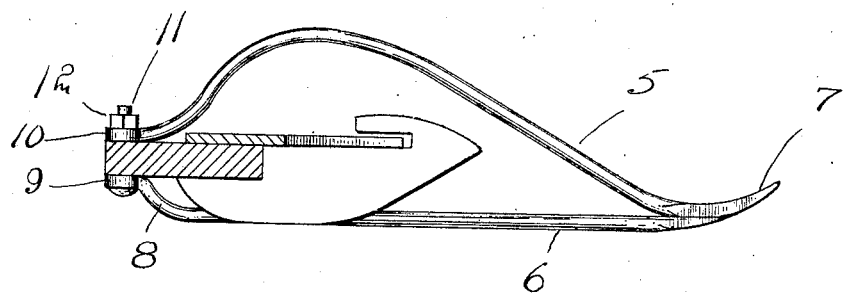
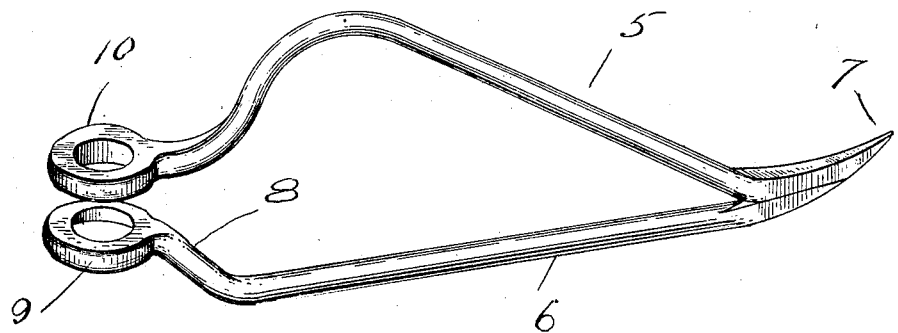
Fig. 2
Witnesses
J. C. Simpson
F. C. Jones
Inventor
Carl Hildenbrand
By Chandler & Chandler
Attorneys

UNITED STATES PATENT OFFICE.

CARL HILDENBRAND, OF ELLSWORTH, KANSAS.

GRAIN-LIFTING ATTACHMENT FOR HARVESTERS.

No. 829,714.  Specification of Letters Patent.  Patented Aug. 28, 1906.

Application filed November 28, 1905. Serial No. 289,390.

*To all whom it may concern:*

Be it known that I, CARL HILDENBRAND, a citizen of the United States, residing at Ellsworth, in the county of Ellsworth, State of Kansas, have invented certain new and useful Improvements in Grain-Lifting Attachments for Harvesters; and I do hereby declare the following to be a full, clear, and exact description of the invention, such as will enable others skilled in the art to which it appertains to make and use the same.

This invention relates to harvesters, and more particularly to attachments therefor, and has for its object to provide a device adapted for attachment to the finger-bar of a harvester and to engage and raise down grain before the latter is reached by the cutter-bar.

Another object is to provide a device of this kind which may be made from bar metal, and thus manufactured at a very low figure.

Other objects and advantages will be apparent from the following description.

In the drawings forming a portion of this specification and in which like numerals of reference indicate similar parts in both views, Figure 1 is a sectional view of a cutter-bar, the present invention being shown in side elevation attached thereto. Fig. 2 is a perspective view of the attachment.

Referring now to the drawings, the present invention comprises upper and lower bars 5 and 6, respectively, which are welded together at their forward ends and sharpened to form a point 7, which is given a slight upward turn. The lower bar 6 extends horizontally from the point 7 and adjacent to its rearward end is bent upwardly and rearwardly, as shown at 8, and is then bent to form a horizontally-extending eye 9, which thus lies in a plane above the major portion of the bar 6.

Rearwardly of the point of union of the two bars the bar 5 is slanted upwardly throughout the major portion of its length and is then curved downwardly and rearwardly and has its extremity bent to form a laterally-extending horizontal eye 10, which lies parallel to and in registration with the eye 9, the two eyes lying in spaced relation. The two bars are of a resilient nature, and the eyes 9 and 10 are thus held yieldably in spaced relation.

In use a plurality of the present attachments are secured to the finger-bar of a harvester over the fingers thereof and with their eyes 9 and 10 resting against the upper and lower surfaces of the finger-bar, the point 7 being directed forwardly. Attaching-bolts 11 are engaged in the finger-bar out of the path of movement of the knife-bar and are engaged in the eyes 9 and 10. Securing-nuts 12 are engaged with the bolts and bear against either one of the eyes, the heads of the bolts bearing against the other eyes, and the tendency of the eyes to separate under the resilience of the bars causes the eyes to bind against the nuts, thus effectually preventing loosening thereof.

As the harvester is moved over the ground the point 7 is engaged beneath the fallen grain and raises it so it may be engaged by the cutter-bar. The upward offset of the eye 9 brings the attachment in close relation to the ground, so as to insure engagement of the point beneath the fallen grain.

What is claimed is—

A device of the class described comprising upper and lower members, said upper member being provided with an upturned tapered forward end, and the said lower member being secured at its corresponding end to the said upper member adjacent its forward end, said members being provided at their rear ends with alining eyes.

In testimony whereof I affix my signature in presence of two witnesses.

CARL HILDENBRAND.

Witnesses:
THOMAS KLUBER,
ROBT. ALLAN.